United States Patent [19]
Scott

[11] Patent Number: 5,348,216
[45] Date of Patent: Sep. 20, 1994

[54] PRINTABLE DISKETTE ENVELOPE FORM

[76] Inventor: John C. Scott, P.O. Box 1066, Greenwich, Conn. 06830

[21] Appl. No.: 192,560

[22] Filed: Feb. 7, 1994

Related U.S. Application Data

[62] Division of Ser. No. 15,410, Feb. 9, 1993.

[51] Int. Cl.$^5$ .................................................. B65D 27/00
[52] U.S. Cl. ....................................... 229/75; 229/68 R
[58] Field of Search ................. 229/75, 76, 80, 80.5, 229/68 R

[56]  References Cited
U.S. PATENT DOCUMENTS

| | | | |
|---|---|---|---|
| 2,697,546 | 12/1954 | Bergstein | 229/75 |
| 2,792,997 | 5/1957 | Affelder | 229/75 |
| 2,803,338 | 8/1957 | Elliott | 229/75 |
| 4,294,400 | 10/1981 | Gendron | 229/75 |
| 4,598,860 | 7/1986 | Pennock | 229/75 |
| 5,279,456 | 1/1994 | Bernstein | 229/75 |

Primary Examiner—Joseph Man-Fu Moy
Attorney, Agent, or Firm—Handal & Morofsky

[57]  ABSTRACT

A computer-printable laminated diskette envelope form is disclosed which has two paper sheets secured by adhesive. Multiple structures are defined by patterns imperforated in the form and include a diskette envelope of novel tapered shape for easy insertion of a diskette and better wear as well as several labels such as a diskette identifier, a customer order label and the like. A pattern for the diskette envelope includes a print area for a directory listing of files stored on the diskette. A customized software utility interacts with the diskette and the envelope form controlling printing of the directory listing and providing a variety of options to users.

7 Claims, 2 Drawing Sheets

PRINTABLE DISKETTE ENVELOPE FORM

This application is a division of application Ser. No. 08/015,410, filed Feb. 9, 1993.

TECHNICAL FIELD

The present invention relates to printable, separable and foldable envelope forms that can be imprinted with a computer directory listing and assembled into an envelope for a diskette.

BACKGROUND

Such an envelope form is know from Segall U.S. Pat. No. 4,708,285 and provides a useful, practical means of listing, organizing and tracking the information contents of individual diskettes and libraries of diskettes. Segall provides a flat, one-piece envelope from on a single sheet of paper which is printed and perforated to provide a removable diskette identification label while comprising a valuable advance in their particular art, with the passage of time, and with extensive use it has become apparent that some improvements would be desirable to overcome drawbacks with existing envelope forms.

One such drawback is that prior art envelope forms are easily torn, especially if they are handled carelessly. Insertion of a diskette into an envelope can be difficult and thicker or bulkier diskettes, especially the currently prevalent 3.5 inch hard diskettes, tend to break out of the package.

SUMMARY OF THE INVENTION

The invention, as claimed, is intended to provide a remedy. It solves the problem of how to provide a diskette envelope form which is easy to use and long-wearing. In another aspect the invention solves the problem of providing a useful object that can be separated from a single sheet and assembled by folding and pressing self-adhesive parts together.

Accordingly, the invention provides a printable diskette envelope form capable of being processed by standard computer printers and comprising a flat sheet of printable material, the sheet being imperforated or scored to define an envelope pattern manually separable from the form, the envelope pattern having a larger back panel, a smaller front panel of shape corresponding with that of the back panel and tab means to secure the back panel to the front panel to be manually assemblable into a pocket for a diskette the envelope form presenting a print area within the envelope pattern to receive a directory listing of files stored on the diskette, wherein the front and back panels have tapered shapes which provide a pocket with a wide opening to receive the diskette, the pocket tapering away from the opening, to fit the diskette closely.

Conveniently there are one or more labels defined in the envelope form as separate shapes non-contiguous with the envelope pattern. The tabs are preferably protected self-adhesive tabs formed integrally in the form. The envelope form material can comprise a laminate of multiple sheets secured by an adhesive layer, the laminate providing one or more tabs in one layer and an adhesive protective strip in another layer, the adhesive layer furnishing adhesive for the self-adhesive tab.

In a preferred embodiment, the laminate comprises two sheets of paper sandwiching an adhesive layer, at least one the sheet being coated with a release agent.

Preferably also, a custom print software utility is provided to print the directory listing the utility comprising means to align a printed listing in a selected area on the envelope form and means to edit and conform the printed data to the area.

In another aspect, the invention provides a printable diskette envelope form capable of being processed by standard computer printers and comprising a flat laminated sheet of printable material having at least two layers of printable stock sandwiching an adhesive layer, the sheet being imperforated or scored to define an envelope pattern, the envelope pattern having a larger back panel, a smaller front panel of shape corresponding with that of the back panel and tab means to secure the back panel to the front panel to be manually assemblable into a pocket for a diskette the envelope form presenting a print area within the envelope pattern to receive a directory listing of files stored on the diskette, the laminate providing one or more the tabs in one layer and an adhesive protective strip in another layer, the adhesive layer furnishing adhesive for the self-adhesive tab.

In a still further aspect, the invention provides a printable form capable of being processed by standard computer printers and comprising a flat laminated sheet having at least two layers of printable stock sandwiching an adhesive layer, said sheet being imperforated or scored to define an object pattern, said object pattern having at least two panels, with corresponding shapes, and tab means to secure said panels together, said panels and tab means being manually assemblable into a useful object, said printable form presenting a print area within said object pattern said laminate providing one or more said tabs in one layer and an adhesive protective strip in another layer, said adhesive layer furnishing adhesive for said self-adhesive tab.

BRIEF DESCRIPTION OF THE DRAWINGS

One way of carrying out the invention is described in detail below with reference to drawings which illustrate only one specific embodiment of the invention and in which.

DETAILED DESCRIPTION

Figure 1:
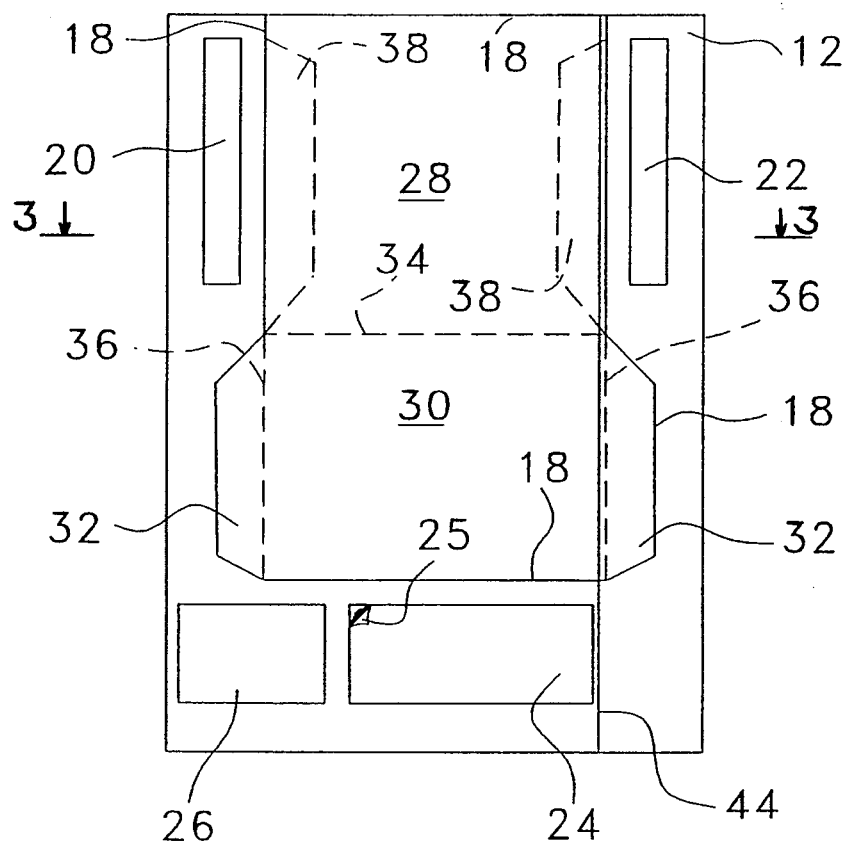
FIG. 1 is a plan view of the front of an envelope form according to the invention.
Figure 2:
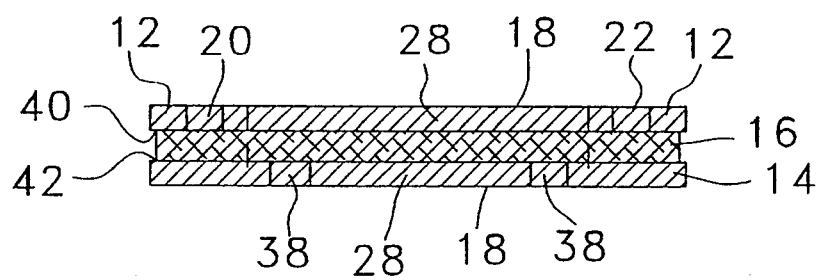
FIG. 2 is an exaggerated, schematic section on the line 3—3 of FIG. 1.

Referring to the drawings, the envelope form 10 shown in FIGS. 1 and 2 has a laminated construction comprising front and back sheets 12 and 14 formed of a suitable paper and secured by a layer of pressure-sensitive adhesive 16. Though laminated, envelope form 10 presents the appearance of a single sheet of paper printed on both sides although, in practice, it is a more complex construction, with fully scored microperforated cutout elements on both sides, partially scored fold lines and a laminated construction with a layer of adhesive between the sheets.

A notable feature of the envelope 10 is that on both sides it comprises a single, coherent sheet of paper fully occupying the space between its rectangular edges without openings or extensions and without additional elements such as protective strips for adhesive areas. All required adhesive lies concealed between front and back sheets 12 and 14, and one sheet serves as an adhesive protector for adhesive coated structures on the other sheet, rendering peel-off protection strips unnecessary.

As shown in FIG. 1, four rectangular labels and an envelope pattern 18 are defined by fully microperforated in front sheet 12. The four rectangular labels comprise, as shown in FIG. 1, extending vertically, an order form label 20 and a return address label 22 and, on either side of the envelope pattern 18, a diskette label 24 and a customer information label 26, both positioned beneath the envelope pattern 18. Diskette label 24 is preferably printed with a logo such as the FLOPPYLOPE trademark of the assignee corporation (JMS Enterprises, Inc.) which provides an eye-catching identifier serving to notify users that the relevant diskette's directory has been printed out on an envelope for the disk. This layout provides a space for printed instructions 27 which space is conveniently in the top left-hand corner of the envelope form 10 if a user holds the form with the diskette label's logo upright.

The microperforations around these structural elements are full in the sense of forming a continuous outline around the element, but they obviously do not extend completely through the back sheet 16. As suggested schematically in FIG. 2, the microperforations around the envelope pattern 18 preferably penetrate partially into the back sheet 14, so that the envelope pattern 18 can be separated from the envelope form 10 with the full thickness of the laminate, including the back sheet 14. On the other hand, the four labels 20–26 are scored, or cut, only through the front sheet 12 so that they may be peeled off the back sheet 16. Adhesive 16 is preferably chosen and applied so that the four labels 20–26 carry a coat of adhesive and are thus rendered self-adhesive after they are peeled off envelope form 10, while in the envelope pattern 18, the two sheets are firmly adhered together and cannot readily be peeled apart.

This arrangement has the advantage of providing a double-layered, more robust construction for the envelope pattern 18 which has mechanical functions and is subject to wear and tear, with a single-layered, flexible construction, and the possibility of being self-adhesive for the labels which are simply informative and are pressed on to some other substrate structure, such as a diskette or mailing envelope.

Envelope pattern 18 comprises an upper slightly trapezium-shaped rectangular back panel 28, a lower front panel 30, which is also trapezium-shaped, and envelope-closing side tabs 32 extending laterally from rear panel 28. Back panel 28 and front panel 30 are further defined by a fold line 34 while tabs 32 are demarked by fold lines 36. Fold lines 34 and 36 comprise partial microperforations, forming broken lines in front sheet 12.

Upper back panel 28 and lower front panel 30 become slightly wider in the direction away from fold line 34 which thus defines a waist in the envelope pattern 18. Parallel to labels 20–22 and within the envelope pattern 18, back panel 28 is partially microperforated, in the layer comprised by back sheet 16, to define two peel-off strips 38. When strips 38 are removed they expose adhesive-coated areas (on the rear surface of the front sheet 12) which can register with tabs 32 after the envelope pattern 18 is folded along lines 34–36.

The front sheet surfaces of panels 28–30 provide an unobstructed area on which a directory listing can be printed by a user prior to assembling a diskette envelope from the envelope form 18. Such a computer printed listing can be aligned to a margin 44 and is preferably printed in, or at least begun in, front panel 30.

While standard operating system software such as MS-DOS (Microsoft Corp.) or from Apple Computer, Inc, or an application program such as WordPerfect (Word Perfect Corp.) can be used to print the envelope form, it is preferred to use a customized utility program, as will be described hereinbelow.

After printing the directory listing and any other desired information on envelope form 10, the envelope pattern 18 and the labels 20–26 are separated out as required. The deep perforations or scoring of the envelope pattern 18 enable it to be cleanly and easily broken or torn out of the envelope form 10. Envelope pattern 18 is then assembled by folding along lines 34–36, with side tabs 32 being folded behind back portion 28 and pressed into secure sealing engagement with the adhesive-coated areas revealed on the back of back panel 28 by removal of peel-off strips 38. A diskette 46 can now be inserted to provide a completed assembly such as that shown in FIG. 3.

This assembly has some distinct advantages over that provided by the prior art construction of Segall. The matching trapezium shapes of front panel 30 and back panel 28 provide a tapered pocket for the diskette 46 which has a relatively wide opening 48 facilitating insertion of the diskette 46. Also, the additional width of the opening 48 is valuable in accommodating the thickness of diskette 46. As compared with prior art constructions, the novel diskette envelope provided by the envelope form of the present invention is thus easier to use, and better wearing, being less likely to tear because of its better proportioned diskette pocket and because of its double-thickness laminated construction.

Figure 3:
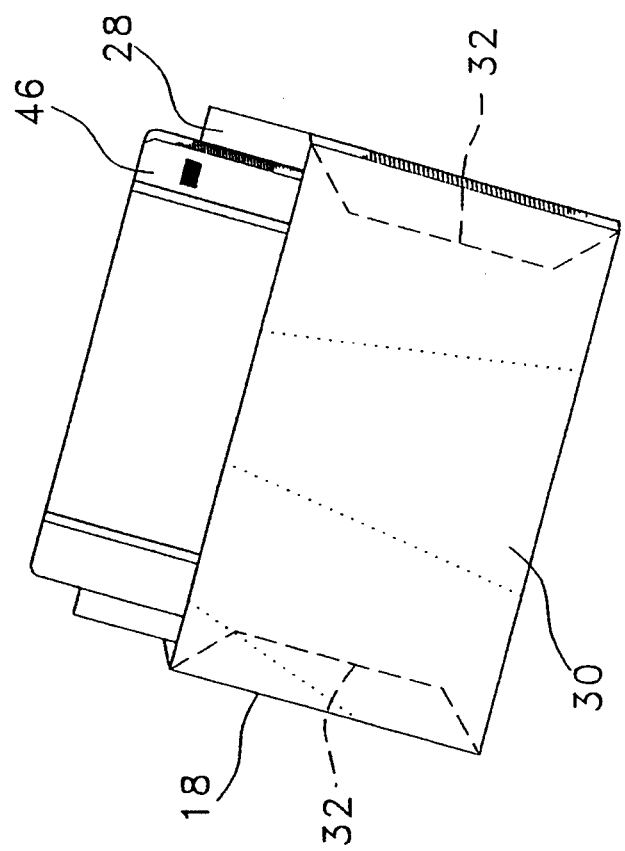
FIG. 3 is a perspective view of an envelope assembled from the form shown in FIGS. 1 and 2.

The particular embodiment shown where, referring to FIG. 3, the tabs 32 adhere to the inside surface of back panel 30 permits some flexing between the panels 28 and 30 with the side tabs 32 performing as, or becoming, gussets; which also assists accommodate diskette 46. Alternatively, tabs 32 can be secured behind back panel 28, as shown in FIG. 3, employing adhesive and peel off protection strips on the tabs 32. or by placing perforated peel-off strips 38 in the front sheet 12 of back panel 28.

It is to be noted that the diskette insertion and wear advantages provided by the present invention are attained without impairing the ability of a diskette and envelope assembly to be filed in conventional diskette files, and the three-dimensional advantages are obtained from a planar envelope form 10.

The printable surface on the back of back sheet 14 provides an excellent saleable advertising space which will come to the attention of users, many of whom are computer administrators making buying decisions and therefore a valuable target audience. After bringing itself to the attention of a user engaged in assembling an envelope form, the message is then substantially concealed in the assembled diskette envelope, an accordingly is not annoying or confusing.

Preferably, the directory listing is printed by means of a custom print software utility comprising a program, or suite of programs with information and tutorial files and the like, which software can be furnished to users on diskette, along with a supply of envelope forms 10, to make a packaged diskette envelope system. This print utility feature of the invention preferably comprises means to align a printed listing in the selected area on the envelope form 18 and means to edit and conform the data to the area. The alignment features should take account of the variations in top of form alignment displayed by conventional dot-matrix, ink-jet, laser and the like computer printers, by permitting user adjustment or configuration. Preferably users are offered selections as to font sizes, the level of detail, for example the ability to select the date or time of the files for printing, the number of columns of file names to print, whether or not to print file extensions, and so on. Noting that, in some cases the number of files can exceed what can be legibly printed in the available readable space on the envelope pattern 18, provision can be made to continue printing the listing on additional envelopes, or a small overflow sheet may be provided, if desired.

The paper used for front sheet 12 and back sheet 14 can be suitably treated stock laser-printer paper, for example, 50 pound. While the outer surfaces can be uncoated, glossy or satin finished, as desired, inner surfaces 40, 42 respectively, are preferably coated with a release agent or are simply glossy or otherwise surfaced to provide the desired adhesion characteristics, namely the ability releasably to coat peeled-off labels and render them self-adhesive, and the ability to provide self-adhesive contact areas for the envelope-closing side tabs 32.

In a further advantageous feature, the print utility software includes means to print general, diskette information as well as specific, file information on the envelope form, for example, volume or other user-specified diskette name, disk space used and available, bad sectors, type of format, and the like. Such information may be printed entirely, or in part, on the diskette label and may be partially or completely duplicated on the envelope form. Desirably, provision is also made to permit users to key in substantial amounts of textual information, or notes, such as several lines or a paragraph or two. Preferably also, the print utility includes a file-saving feature enabling a user to save this or other information to the diskette being labeled, for reuse when that particular diskette is updated with a new directory listing, together with software means automatically to employ that file and reprint the information, with editing if desired.

Alternatively, the label information for multiple diskettes can be stored in a single file and automatically recalled from, for example a hard drive.

The print utility software can include features that automatically or selectively print information for one or more other labels on the envelope form 10, for example return address information or order information. A virtue of the present invention is the arrangement of a multiplicity of self-adhesive, printable labels, such as labels 20–26, on one side of a single printable paper (or other medium) sheet along with the print areas of the envelope pattern 18. Few current computer printers print on both sides of a sheet. It will be clear from the foregoing that a feature of the invention is that the envelope form 10, with its various structures is a single sheet that can be satisfactorily processed by commonly available printers. Preferably, it is also a standard-sized rectangular sheet, for example, 8.5×11 inches for a 5.5 inch diskette, or 6×9 inches for a 3.5 inch diskette, or A4 or smaller for metric usage. Noting however, that many printers have the capability of printing on regular mailing envelopes, as well as sheet or continuous-fed paper, some greater complexity or possibly non-rectangular shapes of the envelope form are possible, but a standard-sized rectangular, composite sheet is envisaged as the principle practical embodiment of the invention.

Envelope form 10 can be manufactured by feeding a composite sheet through top and bottom rotary drum-type die-cutters patterned to provide the respective described outlines for front sheet 12 and back sheet 14, respectively. Form stock can be sheet fed, or it can be continuous stock which is cut to sheet size after scoring and imperforating.

The laminate sheet provided by elements 12–16 can be more complex and can, for example, include a further paper sheet adhesive-coated on both sides to strengthen the envelope structure and facilitate the provision of adhesive coated structures protected by peel off strips.

The laminate sheet provided by elements 12–16 can be put to other uses besides a diskette envelope form. Clearly, there are other products that can be conveniently individually packaged and labeled from such a form, for example prescription medicines, photographs or the like. Also, the laminate sheet can be adapted to provide a novel, single sheet mailer with a built-in return envelope and movable labels to enable a customer or consumer to effect a reply.

While an illustrative embodiment of the invention has been described above, it is, of course, understood that various modifications will be apparent to those of ordinary skill in the art. Such modifications are within the spirit and scope of the invention, which is limited and defined only by the appended claims.

I claim:

1. A printable diskette envelope form capable of being processed by standard computer printers and comprising a flat sheet of printable material, said sheet being imperforated or scored to define an envelope pattern manually separable from said form, said envelope pattern having a larger back panel, a smaller front panel of shape corresponding with that of the back panel and tab means to secure said back panel to said front panel to be manually assemblable into a pocket for a diskette said envelope form presenting a print area within said envelope pattern to receive a directory listing of files stored on said diskette, wherein said front and back panels have tapered shapes which provide a pocket with a wide opening to receive said diskette, said pocket tapering away from said opening, to fit the diskette closely.

2. An envelope form according to claim 1, wherein said back panel adjoins said front panel with a fold line therebetween.

3. An envelope form according to claim 1, further comprising one or more labels defined in said envelope form as separate shapes non-contiguous with said envelope pattern.

4. An envelope form according to claim 1, wherein said tabs are protected self-adhesive tabs formed integrally in said form.

5. An envelope form according to claim 4, wherein said envelope form material comprises a laminate of multiple sheets secured by an adhesive layer, said laminate providing one or more tabs in one layer and an adhesive protective strip in another layer, said adhesive layer furnishing adhesive for said self-adhesive tab.

6. An envelope form according to claim 5, wherein said laminate comprises two sheets of paper sandwiching an adhesive layer, at least one said sheet being coated with a release agent.

7. An envelope form according to claim 1, in combination with a custom print software utility to print said directory listing said utility comprising means to align a printed listing in a selected area on said envelope form and means to edit and conform the printed data to said area.

* * * * *